US012640639B2

(12) United States Patent
Baek

(10) Patent No.: US 12,640,639 B2
(45) Date of Patent: May 26, 2026

(54) POWER SUPPLY DEVICE AND OPERATING METHOD THEREOF

(71) Applicant: LG ELECTRONICS INC., Seoul (KR)

(72) Inventor: Seunghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 18/074,200

(22) Filed: Dec. 2, 2022

(65) Prior Publication Data
US 2024/0079948 A1 Mar. 7, 2024

(30) Foreign Application Priority Data
Sep. 2, 2022 (KR) ........................ 10-2022-0111168

(51) Int. Cl.
*H02M 1/00* (2007.01)
*H02M 1/088* (2006.01)
(Continued)

(52) U.S. Cl.
CPC ....... *H02M 1/0029* (2021.05); *H02M 1/0009* (2021.05); *H02M 1/088* (2013.01); *H02M 1/4233* (2013.01); *H02M 1/44* (2013.01)

(58) Field of Classification Search
CPC ............. H02M 1/0006; H02M 1/0009; H02M 1/0025; H02M 1/0029; H02M 1/0032; H02M 1/0035; H02M 1/0067; H02M 1/007; H02M 1/08; H02M 1/088; H02M 1/12; H02M 1/123; H02M 1/14; H02M 1/143; H02M 1/42; H02M 1/4208; H02M 1/4216; H02M 1/4225; H02M 1/4233; H02M 1/4241; H02M 1/425; H02M 1/4258; H02M 1/44; H02M 3/01; H02M 3/0015; H02M 3/22; H02M 3/24; H02M 3/28; H02M 3/315; H02M 3/335; H02M 3/33507; H02M 3/33515; H02M 3/33523; H02M 3/3353;
(Continued)

(56) References Cited

U.S. PATENT DOCUMENTS

| | | |
|---|---|---|
| 9,553,510 B2 | 1/2017 | Tsukiji et al. |
| 10,784,763 B2 * | 9/2020 | Chu ........................ H02M 1/08 |

(Continued)

FOREIGN PATENT DOCUMENTS

| | | |
|---|---|---|
| CN | 110233582 A | 9/2019 |
| EP | 2 081 285 A2 | 7/2009 |

(Continued)

*Primary Examiner* — Thienvu V Tran
*Assistant Examiner* — Carlos O Rivera-Perez
(74) *Attorney, Agent, or Firm* — Birch, Stewart, Kolasch & Birch, LLP

(57) ABSTRACT

A power supply device for supplying power to an electronic device. The power supply device includes a switched mode power supply (SMPS) comprising at least one switching element and configured to convert an input power input to the power supply device to the power supplied to the electronic device; and a controller configured to obtain a voltage and/or a current of the input power, determine a load of the electronic device based on the obtained voltage and/or current, and set a slew rate of the at least one switching element based on the obtained load.

21 Claims, 11 Drawing Sheets

(51) Int. Cl.
    *H02M 1/42*        (2007.01)
    *H02M 1/44*        (2007.01)

(58) Field of Classification Search
    CPC ......... H02M 3/33538; H02M 3/33546; H02M
               3/33553; H02M 3/33569; H02M 3/33571;
                  H02M 3/33573; H02M 3/155; H02M
                  7/4815; H02M 7/4818; H02M 7/4826;
               H02M 7/523; Y02B 70/10; H05B 45/36;
                    H05B 45/3725; H03K 17/163
    USPC ................. 323/205–211, 271–275, 282–287,
                  323/299–303, 351; 363/15–21.18, 37,
                 363/40–43, 65, 76–79, 89, 95, 97, 98,
                  363/123, 131–134; 327/379, 381
    See application file for complete search history.

(56)                References Cited

U.S. PATENT DOCUMENTS

| | | | |
|---|---|---|---|
| 10,826,485 B2 | 11/2020 | Randolph et al. | |
| 2009/0091957 A1* | 4/2009 | Orr .................... | H02M 3/3376 |
| | | | 363/79 |
| 2014/0159687 A1* | 6/2014 | Lee .................... | H02M 3/1588 |
| | | | 323/282 |
| 2018/0262097 A1 | 9/2018 | Chu et al. | |
| 2020/0035193 A1 | 1/2020 | Seong et al. | |

FOREIGN PATENT DOCUMENTS

| | | | |
|---|---|---|---|
| EP | 3 373 434 A1 | 9/2018 |
| KR | 10-2014-0074009 A | 6/2014 |
| KR | 10-2020-0013199 A | 2/2020 |
| KR | 10-2021-0095619 A | 8/2021 |

* cited by examiner

| Load | 25V/ns | 100V/ns | Efficiency Difference | Variable Slew Rate |
|---|---|---|---|---|
| 10% | 78.5% | 78.8% | -0.26% | 78.8% |
| 20% | 84.1% | 84.3% | -0.19% | 84.3% |
| 30% | 87.1% | 87.3% | -0.20% | 87.3% |
| 40% | 88.9% | 89.0% | -0.14% | 89.0% |
| 50% | 90.0% | 90.2% | -0.15% | 90.2% |
| 60% | 90.8% | 91.0% | -0.15% | 90.8% |
| 70% | 91.4% | 91.5% | -0.15% | 91.4% |
| 80% | 91.8% | 91.9% | -0.12% | 91.8% |
| 90% | 92.0% | 92.1% | -0.14% | 92.0% |
| 100% | 91.5% | 91.7% | -0.17% | 91.5% |

ACQUIRE INPUT VOLTAGE AND /OR CURRENT ──S10

ACQUIRE LOAD OF ELECTRONIC DEVICE BASED ON ACQUIRED VOLTAGE AND/OR CURRENT ──S20

ADJUST SLEW RATE OF SWITCHING ELEMENT OF POWER SUPPLY DEVICE BASED ON ACQUIRED LOAD ──S30

| ACQUIRE OUTPUT VOLTAGE AND/OR OUTPUT CURRENT OF POWER FACTOR IMPROVING UNIT | S40 |

| ACQUIRE LOAD OF ELECTRONIC DEVICE BASED ON ACQUIRED VOLTAGE AND/OR CURRENT | S50 |

| ADJUST SLEW RATE OF SWITCHING ELEMENT OF POWER SUPPLY DEVICE BASED ON ACQUIRED LOAD | S60 |

(a)

(b)

(c)

POWER SUPPLY DEVICE AND OPERATING METHOD THEREOF

CROSS-REFERENCE TO RELATED APPLICATION

The present application claims priority under 35 U.S.C. 119(a) to Korean Patent Application No. 10-2022-0111168, filed on Sep. 2, 2022, which is hereby incorporated by reference in its entirety.

BACKGROUND OF THE INVENTION

The present disclosure relates to a power supply device for supplying power to an electronic device, and more particularly, to a power supply device for reducing electromagnetic interference (EMI) generated in the power supply device and improving power efficiency. As electronic devices are more often connected and operated, the issue of reducing EMI is increasing. EMI is a serious obstacle. For example, EMI can interfere with operations of other electronic devices to cause a malfunction. Accordingly, measures to reduce EMI are important.

Further, EMI is generated in a power supply device by ringing of a switching node to which a switching element is connected. In addition, an EMI level is higher as a slew rate, which is a change in voltage per unit time in a switching element, increases. To reduce the EMI of a power supply device, a slew rate can be reduced by adding an R-C snubber circuit to reduce the ringing of the switching node or designing a gate resistance of a switching element to be high. However, this method has a problem in that the power efficiency of the power supply device is low due to the switching loss caused by the snubber loss or the slew rate reduction.

SUMMARY OF THE INVENTION

The present disclosure aims to reduce EMI of a power supply device when an EMI level of the power supply device is equal to or greater than a reference value.

The present disclosure aims to improve the power efficiency of the power supply device when the EMI level of the power supply device is less than the reference value.

A power supply device for supplying power to an electronic device, the power supply device comprising a switched mode power supply (SMPS) comprising at least one switching element and configured to convert input power by using the at least one switching element and a controller configured to acquire a voltage and/or a current of the input power, wherein the controller is configured to acquire a load of the electronic device based on the acquired voltage and/or current and adjust a slew rate of the at least one switching element based on the acquired load.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A power supply device 100 is merely one embodiment of the present disclosure, and thus, some of the components shown can be integrated, added, or omitted according to the specification of the actually implemented power supply device 100. That is, if necessary, two or more components may be integrated into one component, or one component may be divided into two or more components. Additionally, a function performed by each block is to describe an embodiment of the present disclosure and its specific operation or device does not limit the scope of the present disclosure.

A power supply device and an operating method thereof according to an embodiment of the present disclosure will be described. The power supply device is a device that supplies power to an electronic device. In addition, the electronic device supplied with power from the power supply device according to an embodiment of the present disclosure is any electric device using the motion of electrons. For example, the electronic device described in the present disclosure may be a display device. In more detail, the electronic device is, for example, network TV, Hybrid Broadcast Broadband TV (HBBTV), smart TV, light-emitting diode (LED) TV, organic light-emitting diode (OLED) TV, and so on. In some cases, the electronic device is a smartphone. In addition, the electronic device may be, in addition to the display device, any electric device, such as an electric vehicle, an air conditioner, a refrigerator, a microwave oven, or a computer.

Further, the EMI level of the power supply device according to an embodiment of the present disclosure may be affected by a slew rate of a switching element included in the power supply device. The slew rate of the switching element refers to a change rate of an output voltage. For example, when the switching element is turned on, the slew rate increases as the output voltage rises rapidly. As the slew rate increases, the current changes rapidly. This can cause a ringing of the switching node as a parasitic component of a loop. The ringing of the switching node is a high-frequency switching noise, and EMI can be generated by the ringing of the switching node.

Figure 1:
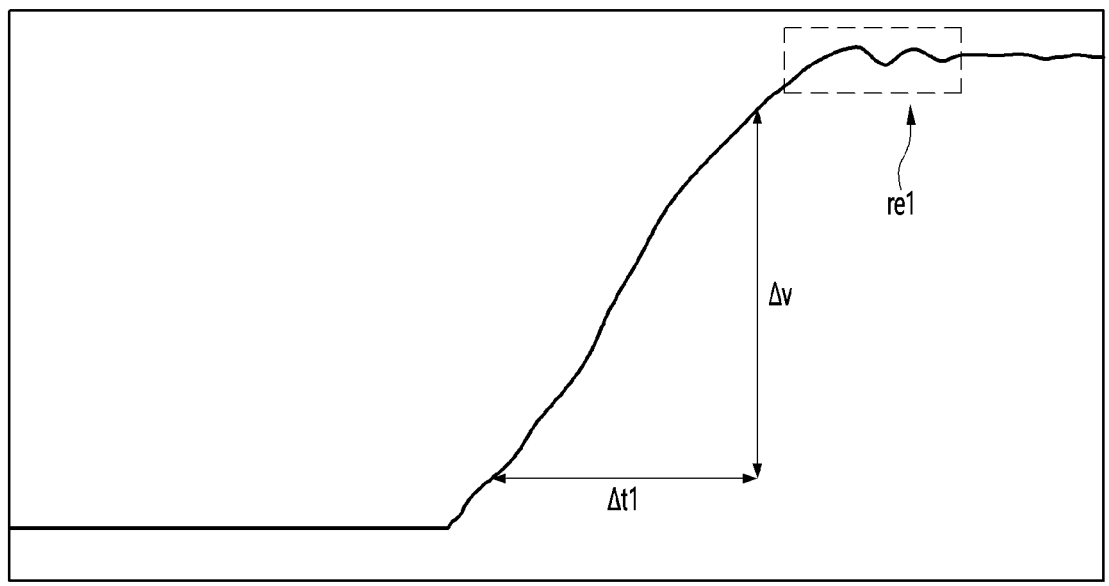
FIG. 1 is a screenshot illustrating a measured switching loss and ringing of a switching node in power supply devices operating at the same operating frequency, according to an embodiment of the present disclosure.
Figure 2:
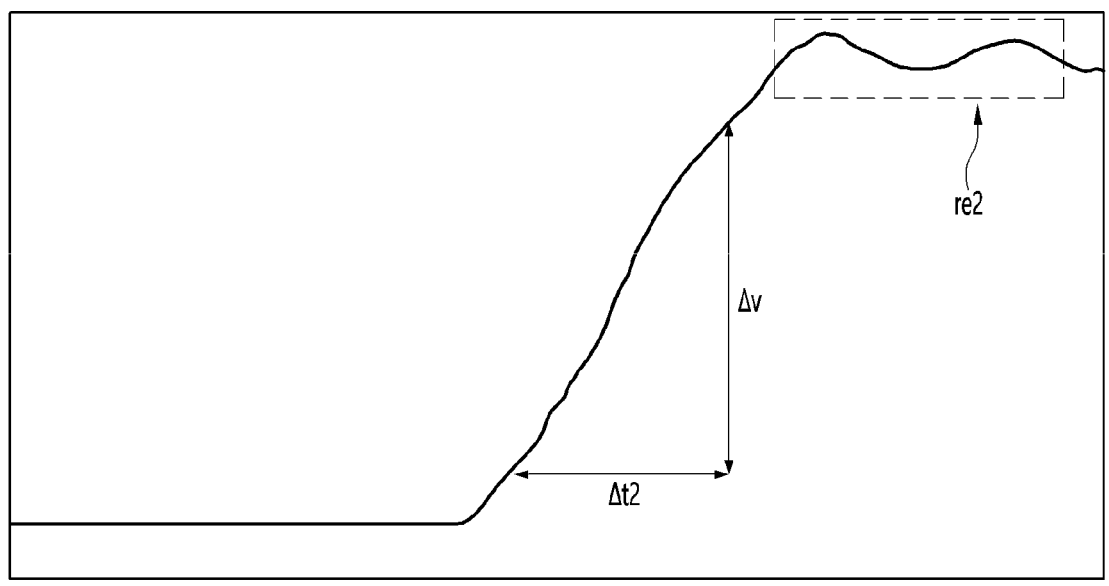
FIG. 2 is a screenshot illustrating a measured switching loss and ringing of a switching node in power supply devices operating at the same operating frequency according to an embodiment of the present disclosure.

This will be described in detail with reference to FIGS. 1 to 4. In particular, FIGS. 1 and 2 are graphs illustrating a measured switching loss and a ringing of a switching node in power supply devices operating at the same operating frequency, according to an embodiment of the present disclosure. In FIGS. 1 and 2, the x-axis represents time, and the y-axis represents voltage.

The power supply devices in the examples of FIGS. 1 and 2 operate at 300 kHz. Specifically, FIG. 1 illustrates a measured switching loss and ringing of a switch node when a slew rate of a switching element of a power supply device is 25 V/ns. In addition, FIG. 2 illustrates a measured switching loss and ringing of a switch node when a slew rate of a switching element of a power supply device is 100 V/ns. That is, the slew rate of FIG. 1 has a first value, and the slew rate of FIG. 2 has a second value greater than the first value.

The Δv in FIGS. 1 and 2 is an increase in the voltage of the switching element when the switching element is turned on. The Δt1 of FIG. 1 is a time required to increase the voltage of the switching element by Δv when the slew rate is 25 V/ns. In addition, the Δt2 of FIG. 2 is a time required to increase the voltage of the switching element by Δv when the slew rate is 100 V/ns. When comparing Δt1 with Δt2, Δt1 is greater than Δt2. Further, since the switching loss increases as the time required to increase the voltage of the switching element increases, the switching loss is greater when the slew rate is 25 V/ns than when the slew rate is 100 V/ns. Accordingly, the power efficiency is lower when the slew rate is 25 V/ns than when the slew rate is 100 V/ns. That is, when the power supply devices 100 operate at the same operating frequency, the switching loss is greater when the slew rate of the power supply device 100 has the first value than when the slew rate of the power supply device 100 has the second value. Accordingly, the power efficiency is lower when the slew rate has the first value than when the slew rate has the second value.

Further, the re1 of FIG. 1 represents a ringing of the switching node when the slew rate of the power supply device 100 is 25 V/ns. Also, the re2 of FIG. 2 represents a ringing of the switching node when the slew rate of the power supply device 100 is 100 V/ns. When comparing the re1 of FIG. 1 with the re2 of FIG. 2, the waveform of re2 is more distinct than the waveform of re1. That is, the ringing of the switching node is smaller when the slew rate is 25 V/ns than when the slew rate is 100 V/ns. That is, the ringing of the switching node is smaller when the slew rate has the first value than when the slew rate has the second value.

Further, as the ringing of the switching node increases, the EMI level of the power supply device 100 is higher. A detailed description will be given with reference to FIGS. 3 and 4.

Figure 3:
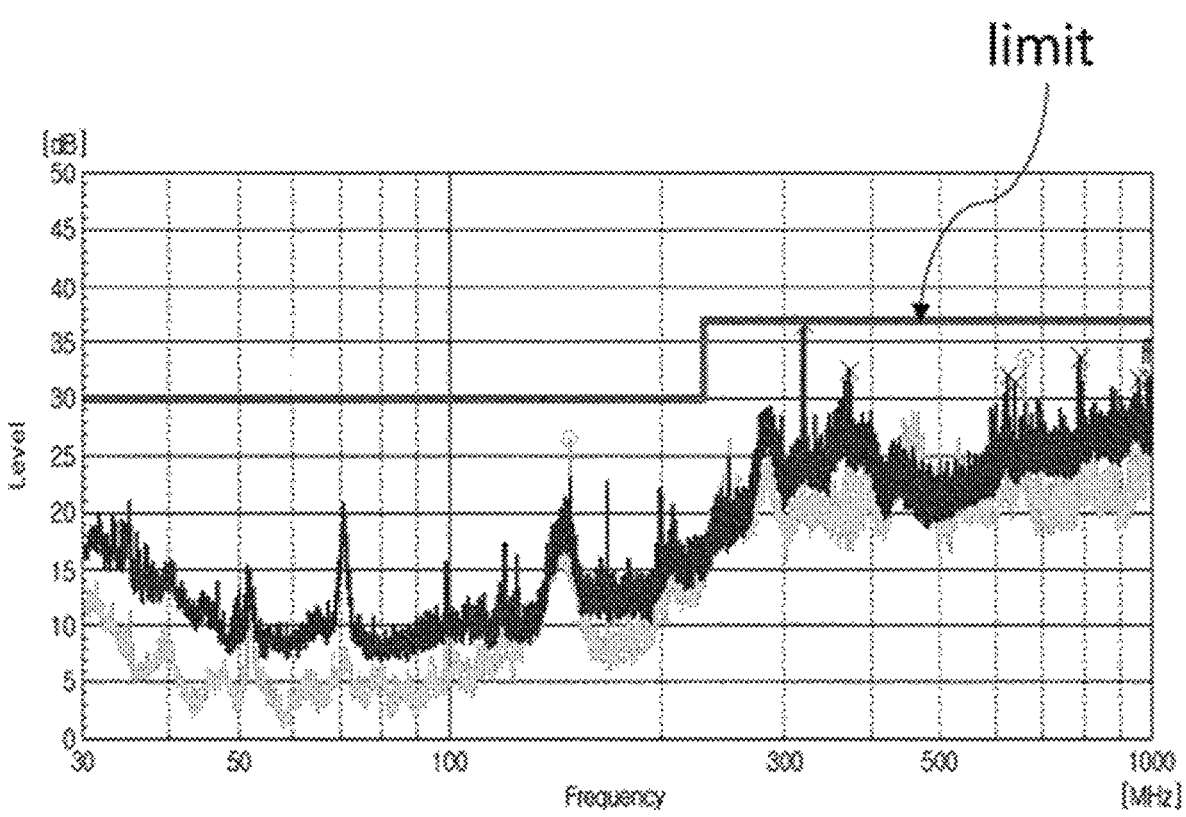
FIG. 3 is a graph illustrating measured EMI levels of power supply devices according to an embodiment of the present disclosure.
Figure 4:
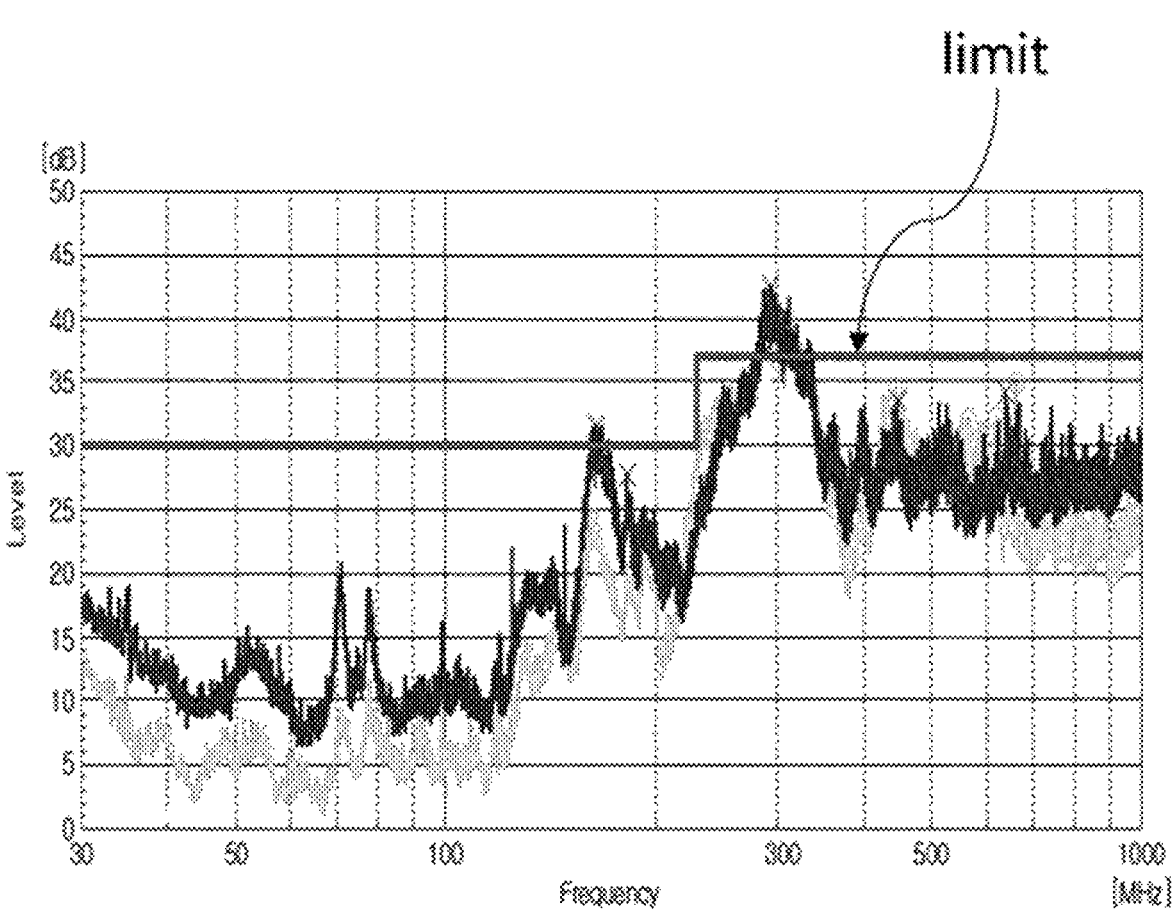
FIG. 4 is a graph illustrating measured EMI levels of power supply devices according to an embodiment of the present disclosure.

In particular, FIGS. 3 and 4 are graphs illustrating measured EMI levels of power supply devices according to an embodiment of the present disclosure. In more detail, FIG. 3 illustrates a measured EMI level when the slew rate of the switching element of the power supply device 100 is fixed to 25 V/ns. In addition, FIG. 4 illustrates a measured EMI level when the slew rate of the switching element of the power supply device 100 is fixed to 100 V/ns.

In FIGS. 3 and 4, the x-axis represents the EMI frequency of the power supply device 100, and the y-axis represents the EMI level. In addition, the limit is a line indicating the limit of the allowable EMI level according to the EMI standard. First, referring to FIG. 3, when the slew rate is 25 V/ns, an EMI level of a portion having an EMI frequency of 300 MHz does not exceed the limit. However, referring to FIG. 4, when the slew rate is 100 V/ns, an EMI level of a portion having an EMI frequency of 300 MHz exceeds the limit. That is, when the slew rate is the second value greater than the first value, the EMI level exceeds the limit.

To prevent the generation of EMI in which the EMI level exceeds the limit in the power supply device 100, the slew rate of the power supply device 100 can be fixed to the first value lower than the second value. For example, to reduce the EMI of the power supply device according to an embodiment of the present disclosure, the slew rate can be lowered by designing the gate resistance of the switching element to be higher, or an R-C snubber circuit to reduce the ringing of the switching node can be added. However, this design change has a problem in that the power efficiency of the power supply device 100 is low due to a switching loss caused by a reduction in the slew rate or snubber loss.

In addition, the switching loss is lower when the slew rate is the second value than when the slew rate is the first value. Even in this instance, if the slew rate is fixed to the first value, there is a problem in that power efficiency is reduced due to the switching loss as described with reference to FIGS. 1 and 2. Accordingly, the power supply device of the present disclosure minimizes the EMI level and improves the power efficiency by varying, changing, adjusting or setting the slew rate of at least one switching element included in a switched mode power supply (SMPS).

Figure 5:
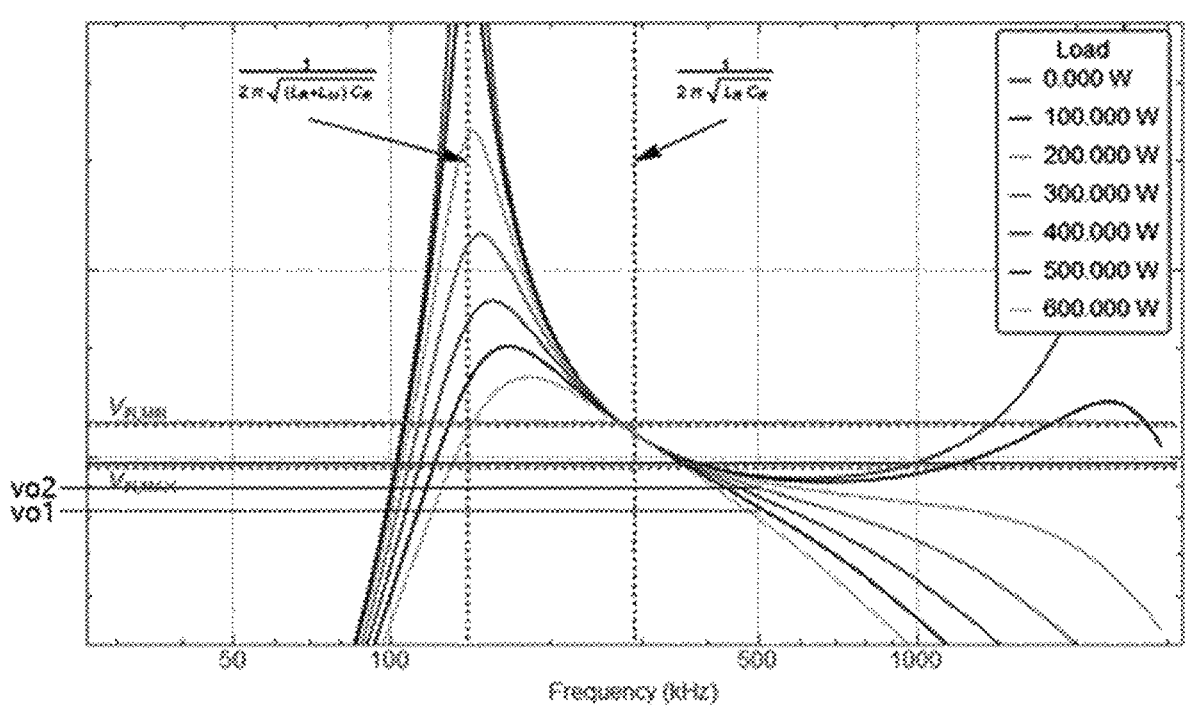
FIG. 5 is a graph illustrating a measured output voltage of the power supply device according to an embodiment of the present disclosure.

In more detail, FIG. 5 is a graph obtained by measuring the output voltage of the power supply device according to an embodiment of the present disclosure. In FIG. 5, the x-axis represents the operating frequency of the power supply device, and the y-axis represents the output voltage of the power supply device. Referring to FIG. 5, when the operating frequency of the power supply device 100 is $$\frac{1}{2\pi\sqrt{L_R C_R}},$$

the output of the power supply device 100 is the same regardless of the load of the electronic device 200. When the operating frequency of the power supply device 100 is different from $$\frac{1}{2\pi\sqrt{L_R C_R}},$$

the output of the power supply device 100 is different according to the load of the electronic device 200. For example, as shown in FIG. 5, when the power supply device has an operating frequency of 500 kHz and the load of the electronic device is 500,000 W, the output voltage is vo1. When the power supply device has an operating frequency of 500 kHz and the load of the electronic device is 300,000 W, the output voltage is vo2. That is, when the load of the electronic device is different, the output voltage of the power supply device is different. When comparing vo1 with vo2, vo2 is greater than vo1. That is, when the load of the electronic device is smaller, the output voltage of the power supply device is higher. In addition, when the load of the electronic device is larger, the output voltage of the power supply device is lower.

As such, the output voltage of the power supply device is not constant. When such a non-constant voltage is supplied to the electronic device, a failure of the electronic device can be caused. To prevent this, the output voltage of the power supply device can be stabilized so that the power supply can supply a constant voltage to the electronic device. To stabilize (regulate) the output voltage of the power supply device, it is preferable to apply a gain value. In particular, the gain is calculated as a value obtained by dividing the voltage that the power supply device intends to supply to the electronic device by the output power of the power supply device. For example, when the voltage that the power supply device intends to supply to the electronic device is 24 V and the output voltage of the power supply device is 16.67 V, the gain is 1.439 V (=24 V/16.67 V).

Because the gain is the value obtained by dividing the voltage that the power supply device intends to supply to the electronic device by the output power of the power supply device, the gain value is lower as the output voltage of the power supply device is lower when the power supply device intends to supply a constant voltage to the electronic device. For example, when the voltage that the power supply device intends to supply to the electronic device is 24 V and the output voltage of the power supply device is 15 V, the gain is 1.6 V (=24 V/15 V). In addition, when the voltage that the power supply device intends to supply to the electronic device is 24 V and the output voltage of the power supply device is 17 V, the gain is 1.412 V (=24 V/17 V). That is, the gain when the output voltage of the power supply device is 15 V is higher than the gain when the output voltage of the power supply device is 17 V.

In summary, when the load of the electronic device decreases, the output voltage of the power supply device increases. As the output voltage of the power supply device increases, the gain value for stabilizing the output voltage decreases.

Next, a relationship between the gain value for stabilizing the output voltage of the power supply device and the operating frequency of the power supply device will be described with reference to FIG. 6. In particular, FIG. 6 is a frequency characteristic graph of a power supply device according to an embodiment of the present disclosure.

Figure 6:
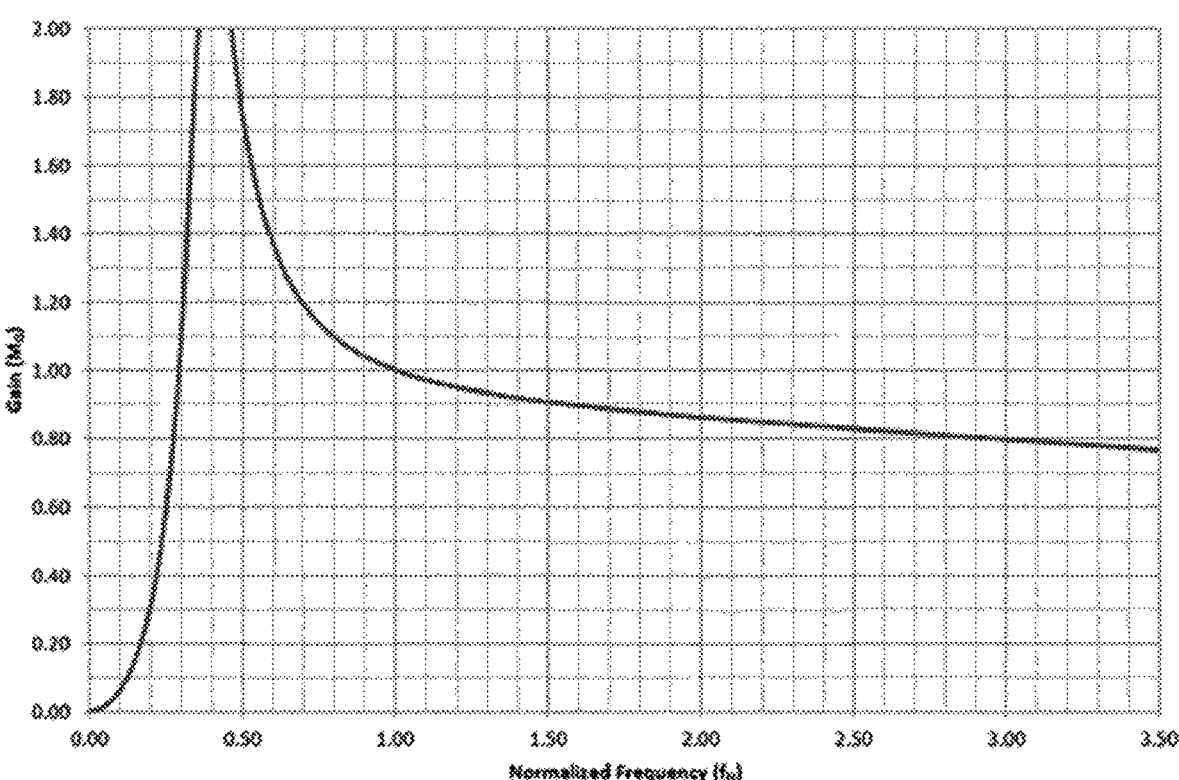
FIG. 6 is a frequency characteristic graph of a power supply device according to an embodiment of the present disclosure.

Specifically, FIG. 6 is a frequency characteristic graph of a power supply device when the power supply device includes an LLC resonant converter, according to an embodiment of the present disclosure. In FIG. 6, the x-axis represents a normalized frequency of the power supply device. The normalized frequency is obtained by dividing an operating frequency of the power supply device by a resonant frequency. That is, the normalized frequency is proportional to the operating frequency of the power supply device. The y-axis represents a gain of the power supply device.

Referring to FIG. 6, when the gain value required to stabilize the output voltage of the power supply device is 1.20, the normalized frequency is 0.70. When the required gain value is 0.90, the normalized frequency is 1.50. That is, when the gain value is a first value, the normalized frequency is a first normalized frequency. When the gain value is a second value less than the first value, the normalized frequency is a second normalized frequency greater than the first normalized frequency. Therefore, the power supply device can have a higher normalized frequency as the gain value is lower. The normalized frequency of the power supply device is also proportional to the operating frequency. That is, the power supply device can have a higher operating frequency as the gain value is lower.

Referring to FIGS. 5 and 6, when the load of the electronic device decreases, the output voltage of the power supply device increases. As the output voltage of the power supply device increases, the gain value for stabilizing the output voltage decreases. When the gain value decreases, the normalized frequency of the power supply device increases, which means an increase in the operating frequency. That is, as the load of the electronic device is smaller, the operating frequency of the power supply device is higher.

Further, as the operating frequency of the power supply device increases, the switching loss increases. Specifically, the switching loss is divided into a driving loss, a turn on loss, a turn off loss, and a body diode loss. Among them, the turn on loss is not related to the operating frequency of the power supply device, and the driving loss, the turn off loss, and the body diode loss are proportional to the operating frequency of the power supply device. That is, as the operating frequency of the power supply device increases, the switching losses increase. As described above, when the load of the electronic device is reduced, the operating frequency of the power supply device increases. Therefore, as the operating frequency increases, the switching loss increases.

Because the turn off loss among switching losses is proportional to the amount of change in voltage, the switching loss increases as the slew rate decreases. As described above, when the load of the electronic device is reduced, the switching loss increases and thus power efficiency decreases. Accordingly, the present disclosure aims improves the power efficiency by increasing the slew rate to reduce the switching loss.

Figure 7:
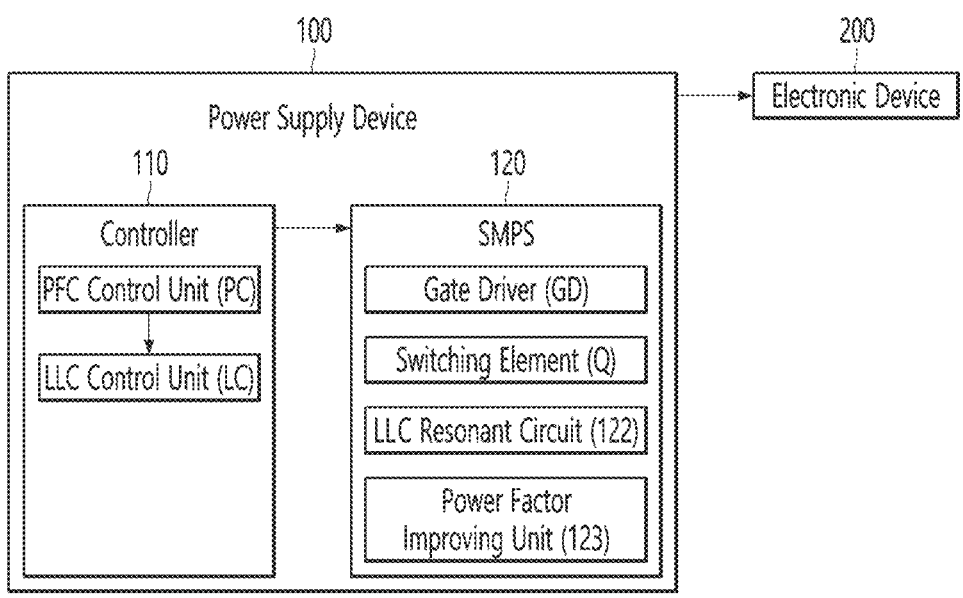
FIG. 7 is a block diagram illustrating a configuration of a power supply device according to an embodiment of the present disclosure.

Accordingly, the power supply device of the present disclosure minimizes EMI generation and improves power efficiency by controlling the slew rate of at least one switching element included in the SMPS of the power supply device based on the load of the electronic device. In more detail, FIG. 7 is a block diagram illustrating a configuration of a power supply device according to an embodiment of the present disclosure. Referring to FIG. 7, the power supply device 100 includes a controller 110 and/or an SMPS 120.

The power supply device 100 can receive power from the outside and supply the power to the electronic device 200. The power supply device 100 can be provided outside the electronic device 200 or be provided inside the electronic device 200 to form a part of the electronic device 200.

The power supplied by the power supply device 100 to the electronic device 200 can be supplied to all components provided inside the electronic device 200 and all components connected to the outside of the electronic device 200 requiring power supply. For example, when the electronic device 200 is a display device, the power supplied by the power supply device 100 can be supplied to at least one of a main controller of the display device, a display, a speaker, and an external device connected through a user input interface.

The SMPS 120 can include at least one of a gate driver GD, one or more switching elements Q, an LLC resonant circuit 122, and a power factor improving unit 123. In addition, the SMPS 120 can be a converter such as an LLC resonant converter. The SMPS 120 can also have various power conversion topologies, such as a buck converter, a boost converter, a flyback converter, and a half-forward converter. The gate driver GD also includes a gate and a current source for outputting a current for driving the switching element Q.

Further, the switching element Q can include a semiconductor switch such as a field effect transistor (FET), a metal-oxide-semiconductor field-effect transistor (MOS-FET), and an insulated gate bipolar transistor (IGBT) or wide band gab (WBG) element. This is only an example and the present disclosure is not limited thereto. Further, the WBG element can be silicon carbide (SiC) or gallium nitride (GaN).

In addition, the SMPS 120 can include the LLC resonant circuit 122. In this instance, the SMPS 120 is an LLC resonant converter. This is only an example and the SMPS 120 can have a different power conversion topology, and include other circuits for converting input power other than the LLC resonant circuit 122. Also, the power factor improving unit 123 can improve the power factor of the power input to the power supply device 100 and output the power, with an improved power factor.

Figure 8:
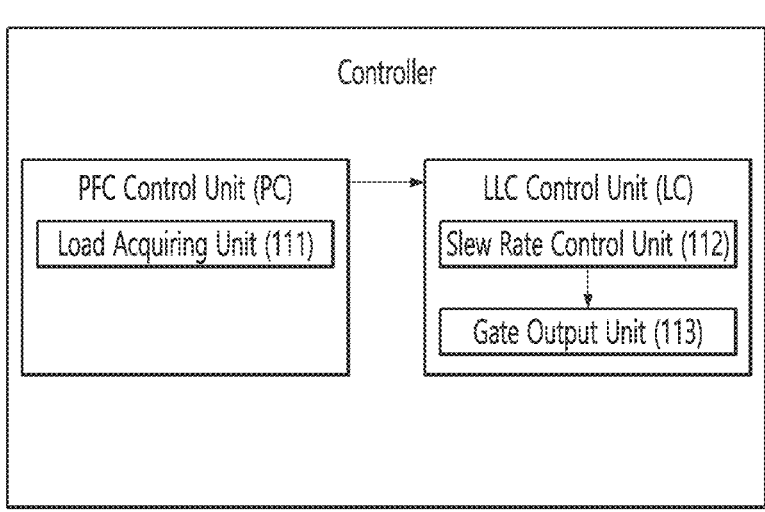
FIG. 8 is a block diagram illustrating the configuration of the controller of the power supply device according to an embodiment of the present disclosure.

Further, the controller 110 will be described in detail with reference to FIG. 8. In particular, FIG. 8 is a block diagram illustrating the configuration of the controller 110 of the power supply device according to an embodiment of the present disclosure. Referring to FIG. 8, the controller 110 can include a PFC control unit PC and/or an LLC control unit LC.

The PFC control unit PC controls the power factor improving unit 123 to improve the power factor of the power input to the power supply device 100 and outputs the power with the improved power factor. As shown, the PFC control unit PC also includes a load acquiring unit 111. The load acquiring unit 111 can acquire a voltage and/or a current of the input power. Alternatively, the load acquiring unit 111 can acquire a voltage and/or a current output from the power factor improving unit 123.

The load acquiring unit 111 can acquire a voltage and/or a current of the one or more switching elements Q, and acquire the load of the electronic device 200 based on the acquired voltage and/or current. The load acquiring unit 111 can also transmit the acquired load to a slew rate control unit 112. As shown in FIG. 8, the LLC control unit LC can include the slew rate control unit 112 and/or a gate output unit 113.

Further, the slew rate control unit 112 can receive the load from the load acquiring unit 111 and determine a slew rate value to be applied to the switching element Q based on the received load. The slew rate control unit 112 can also control the power supply device 100 to drive the switching element Q with the acquired slew rate value. For example, the slew rate control unit 112 can control a current output from a current source of a gate driver for driving the switching element Q based on a received load.

Further, the gate output unit 113 can output a gate signal so that the switching element Q can be driven based on the current output from the current source of the gate driver GD controlled by the slew rate control unit 112. Accordingly, the slew rate of the switching element Q is driven by being changed to the slew rate value obtained by the slew rate control unit 112. Therefore, the voltage of the switching node to which the switching element Q is connected or the amount of change in voltage is changed. That is, whether to change the slew rate is obtained by measuring the voltage of the switching node Q.

For convenience of explanation, the configuration of the controller is divided into the PFC control unit PC, the LLC control unit LC, the load acquiring unit 111, the slew rate control unit 112, and the gate output unit 113. However, the scope of the present disclosure is applied to all components that perform the operation for controlling the slew rate. Further, the structure of the power supply device 100 according to the present disclosure is various. Next, the structures of power supply devices according to first and second embodiments of the present disclosure will be described.

Figure 9:
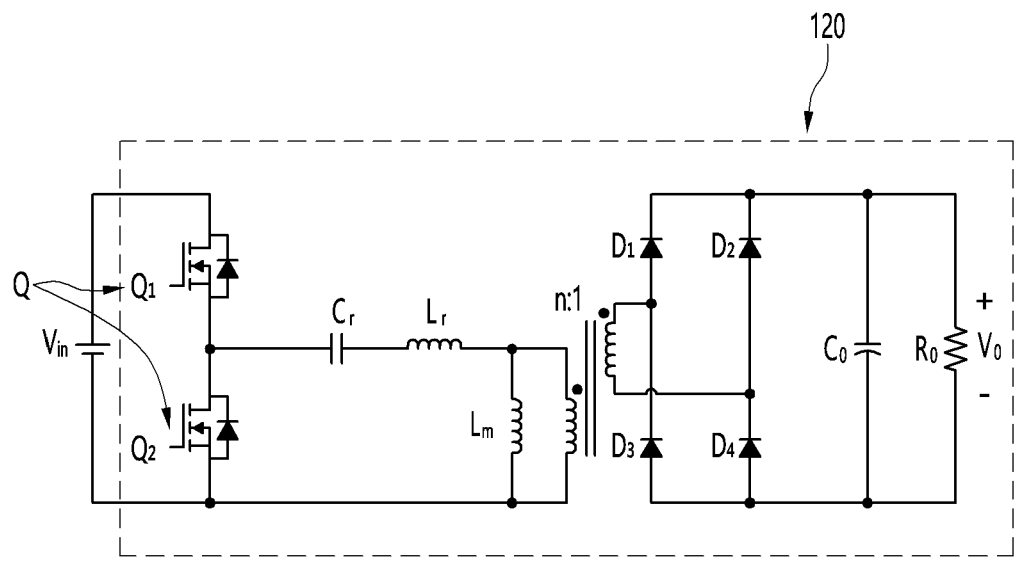
FIG. 9 is a circuit diagram of a power supply device according to a first embodiment of the present disclosure.

In particular, FIG. 9 is a circuit diagram of a power supply device according to a first embodiment of the present disclosure. Referring to FIG. 9, an SMPS 120 included in the power supply device 100 is an LLC resonant converter. However, as described above, the scope of the present disclosure is not limited to the SMPS 120 being the LLC resonant converter, and can be any power conversion topology.

As shown in FIG. 9, the SPS 120 includes at least one switching element Q. FIG. 9 illustrates the switching element Q including a first switching element Q1 and a second switching element Q2. That is, the SMPS 120 is a half-bridge converter. In addition, the SMPS 120 can be a full-bridge converter including first to fourth switching elements.

Figure 10:
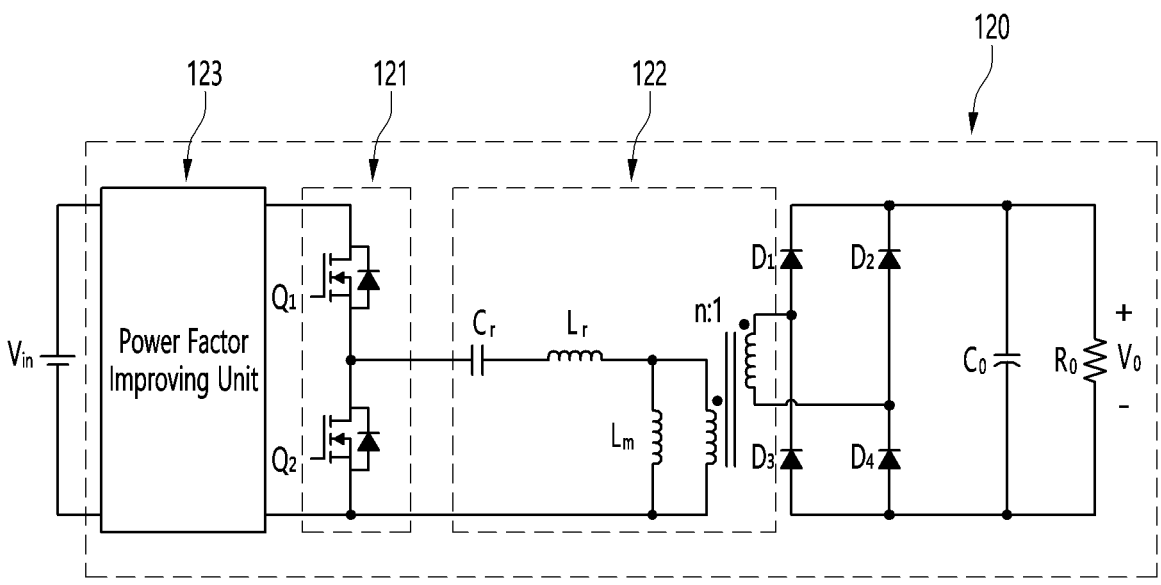
FIG. 10 is a circuit diagram of a power supply device according to a second embodiment of the present disclosure.

Next, FIG. 10 is a circuit diagram of a power supply device according to a second embodiment of the present disclosure. The second embodiment is the same as the first embodiment, except that the second embodiment further includes a power factor improving unit 123.

Referring to FIG. 10, the SMPS 120 can further include a bridge circuit 121 to which input power is applied, an LLC resonant circuit 122 connected to the bridge circuit 121, and a power factor improving unit 123 for improving the power factor of the input power and outputting the input power with an improved power factor to the bridge circuit 121. The power factor improving unit 123 can improve the power factor of the input power applied to the SMPS 120 and output the input power with the improved power factor.

Figures 11, 12:
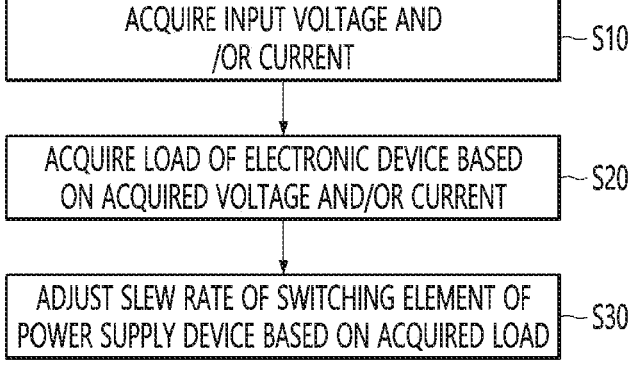
FIG. 11 is a table showing power efficiency of a power supply device according to an embodiment of the present disclosure.
FIG. 12 is a flowchart showing an operating method of a power supply device according to a first embodiment of the present disclosure.

Next, the power efficiency of the power supply device as described with reference to FIGS. 9 and 10 will be described. In particular, FIG. 11 is a table showing the power efficiency of a power supply device according to an embodiment of the present disclosure. Specifically, FIG. 11 is a table showing the power efficiency of the power supply device 100 according to the load of the electronic device 200 and the slew rate of the switching element Q.

Referring to FIG. 11, the power efficiency when the slew rate is 25 V/ns is lower than the power efficiency when the slew rate is 100 V/ns. That is, the power efficiency when the slew rate of the switching element Q has a first value is lower than the power efficiency when the slew rate has a second value greater than the first value. When the load of the electronic device 200 is 30% of the maximum load, the power efficiency when the slew rate is 25 V/ns is 87.1%, and the power efficiency when the slew rate is 100 V/ns is 87.3%. Therefore, the difference in power efficiency is 0.20%. When the load of the electronic device 200 is 70% of the maximum load, the power efficiency when the slew rate is 25 V/ns is 91.4%, and the power efficiency when the slew rate is 100 V/ns is 91.5%. Therefore, the difference in power efficiency is 0.15%. As such, the difference in power efficiency according to the slew rate when the load is 30% of the maximum load is greater than the difference in power efficiency according to the slew rate when the load is 70% of the maximum load.

That is, as the load of the electronic device 200 approaches the maximum load, the difference in power efficiency according to the slew rate adjustment of the power supply device 100 decreases. That is, as the load increases, the efficiency degradation due to the reduction of the slew rate decreases. In addition, as the load of the electronic device 200 decreases, the difference in power efficiency according to the difference in the slew rate of the power supply device 100 increases. This means that as the load decreases, the efficiency degradation due to the reduction of the slew rate increases.

Accordingly, the load of the electronic device 200 is divided into a light load and a heavy load based on a predetermined value. For the light load, the slew rate is increased, and for the heavy load, the slew rate is decreased.

Referring to the table of FIG. 11, a reference load for classifying the light load and the heavy load is 30%, but this is only an example. The reference load for classifying the light load and the heavy load can be 50% or other values. The power supply device 100 according to an embodiment of the present disclosure improves the power efficiency by increasing the slew rate when the load of the electronic device 200 is the light load.

Accordingly, the power supply device 100 according to an embodiment of the present disclosure acquires the load of the electronic device 200 and adjust the slew rate of at least one switching element Q included in the SMPS 120 based on the acquired load. Specifically, when the load of the electronic device 200 is equal to or greater than a preset reference ratio of the maximum load of the electronic device 200, the power supply device 100 adjusts the slew rate to a first value, and when the load is less than the reference ratio, the power supply device 100 adjusts the slew rate to a second value greater than the first value. For example, the preset reference ratio can be 50% of the maximum load. When the load of the electronic device 200 is 30% of the maximum load, the slew rate is adjusted to 25 V/ns. In addition, when the load of the electronic device 200 is 80% of the maximum load, the slew rate is adjusted to 100 V/ns. Accordingly, when the load of the electronic device 200 is equal to or greater than the preset reference ratio, the power efficiency can be improved, and when the load of the electronic device 200 is less than the preset reference ratio, the EMI can be reduced.

Further, the reference load can be a value such that the operating frequency of the power supply device 100 becomes $$\frac{1}{2\pi\sqrt{L_R C_R}}.$$

For example, when the load of the power supply device 200 is a light load, the operating frequency of the power supply device 100 is equal to or greater than $$\frac{1}{2\pi\sqrt{L_R C_R}},$$

and when the load of the power supply device 200 is a heavy load, the operating frequency of the power supply device 100 is less than $$\frac{1}{2\pi\sqrt{L_R C_R}}.$$

Next, an operating method of a power supply device according to a first embodiment of the present disclosure will be described in detail with reference to FIG. 12. In particular, FIG. 12 is a flowchart showing an operating method of a power supply device according to a first embodiment of the present disclosure. As shown, the controller 110 can acquire a voltage and/or a current of input power (S10). The controller 110 can acquire a voltage and/or a current of power input to the power supply device 100 and acquire a load of the electronic device based on the acquired voltage and/or current (S20).

Because the voltage and current of the input power increase as the load of the electronic device 200 increases, the controller 110 can acquire the load of the electronic device 200 based on the acquired voltage and/or current. The controller 110 can also calculate the load of the electronic device 200 based on the acquired voltage and/or current. Further, the controller 110 can acquire that the load of the electronic device 200 is greater as the acquired voltage and/or current is higher.

Also, the controller 110 can adjust the slew rate of the switching element Q of the power supply device 100 based on the acquired load (S30). Further, the controller 110 can increase the slew rate as the load of the electronic device 200 decreases. For example, when the SMPS 120 is the half-bridge converter including the first switching element Q1 and the second switching element Q2, the controller 110 can increase the slew rates of the first switching element Q1 and the second switching element Q2 as the load of the electronic device 100 decreases.

The controller 110 can also decrease the slew rate as the load of the electronic device 200 increases. For example, when the SMPS 120 is the half-bridge converter including the first switching element Q1 and the second switching element Q2, the controller 110 can decrease the slew rates of the first switching element Q1 and the second switching element Q2 as the load of the electronic device 100 increases.

In summary, the controller 110 can obtain the voltage and/or the current of the input power, determine the load of the electronic device 200 based on the determined voltage and/or current, and adjust the slew rate of the at least one switching element Q based on the acquired load. In addition, the controller 110 can obtain a voltage and/or a current of power input to the SMPS 120, determine the load of the electronic device 200 based on the acquired voltage and/or current, and adjust the slew rate of the at least one switching element Q based on the determined load.

In summary, the power supply device 100 according to the first embodiment of the present disclosure can determine the load based on the voltage and/or the current of the input power, and adjust the slew rate based on the determined load.

Figure 13:
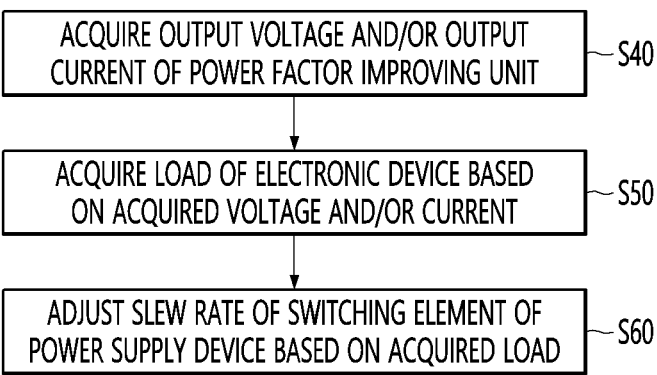
FIG. 13 is a flowchart showing an operating method of a power supply device according to a second embodiment of the present disclosure.

Next, an operating method of a power supply device according to a second embodiment of the present disclosure will be described in detail with reference to FIG. 13. In particular, FIG. 13 is a flowchart showing an operating method of a power supply device according to a second embodiment of the present disclosure.

As shown, the controller 110 can acquire or obtain an output voltage and/or an output current of the power factor improving unit 123 (S40). The power factor improving unit 123 can then adjust the power factor of the input power and output the input power with the improved power factor. When the power supply device 100 further includes the power factor improving unit 123, the controller 110 can acquire an output voltage and/or an output current of the power factor improving unit 123. Further, even when the power supply device 100 further includes the power factor improving unit 123, the controller 110 can acquire the voltage and/or the current of the input power.

In addition, the controller 110 can acquire a load of the electronic device based on the acquired voltage and/or current (S50). In particular, the controller 110 can acquire the load of the electronic device 200 based on the acquired output voltage and/or current of the power factor improving unit 123. The controller 110 can calculate the load of the electronic device 200 based on the acquired voltage and/or current, and also acquire that the load of the electronic device 200 is greater as the acquired voltage and/or current is higher.

When the controller 110 acquires the voltage and/or current of the input power in operation S40, the controller 110 can acquire the load of the electronic device 200 based on the acquired voltage and/or current of the switching element Q. The controller 110 can then adjust the slew rate of the switching element of the power supply device 100 based on the acquired load (S60). Further, the controller 110 can increase the slew rate as the load of the electronic device 200 decreases, and decrease the slew rate as the load of the electronic device 200 increases.

In summary, the power supply device 100 according to the second embodiment of the present disclosure can further include the bridge circuit 121 to which the input power is applied, the LLC resonant circuit 122 connected to the bridge circuit 121, and the power factor improving unit 123 that improves the power factor of the bridge circuit 121 and outputs the power with the improved power factor to the bridge circuit 121. Further, the controller 110 can acquire the load based on the voltage and/or current of the power output from the power factor improving unit 123 that adjusts the slew rate based on the voltage and/or current of the power output from the power factor improving unit 123, and adjust the slew rate based on the acquired load. The controller 110 can also decrease the slew rate as the acquired voltage and/or current increases, and increase the slew rate as the voltage and/or current decreases.

Next, a detailed method by which the power supply device 100 adjusts the slew rate of the switching element Q according to an embodiment of the present disclosure will be described. The controller 110 can adjust the slew rate by controlling the current output from the gate driver GD that controls at least one switching element. For example, as the load of the electronic device 200 decreases, the controller 110 can greatly adjust the slew rate of the switching element Q by increasing the current output from the gate driver GD. Alternatively, as the load of the electronic device 200 increases, the controller 110 can decrease the current output from the gate driver GD, thereby reducing the slew rate of the switching element Q.

Next, a method by which the power supply device 100 adjusts the slew rate of the switching element Q according to another embodiment of the present disclosure will be described. The SMPS 120 of the power supply device 100 can further include a gate resistance circuit. In this instance, the controller 110 can adjust the slew rate of the switching element Q by adjusting the resistance value of the gate resistance circuit based on the acquired load of the electronic device 200. That is, as the acquired load of the electronic device 200 is smaller, the controller 110 can increase the slew rate by decreasing the resistance value of the gate resistance circuit. Alternatively, as the acquired load of the electronic device 200 is larger, the controller 110 can decrease the slew rate by increasing the resistance value of the gate resistance circuit.

Further, the scope of the present disclosure is not limited to the above-described method for adjusting the slew rate, and the present disclosure is applied to any methods of varying the slew rate. In addition, the power supply device according to the first or second embodiment of the present disclosure can operate in various methods different from those described with reference to FIGS. 12 and 13.

According to an embodiment, the power supply device 100 can acquire the load change in real time, and accordingly, also change the slew rate in real time. For example, the controller 110 can acquire the load of the electronic device 200 every preset period. When a load acquired at a second time point later than a first time point is higher than a load acquired at the first time point, the controller 110 can decrease the slew rate at the second time point by a predetermined magnitude, compared to the slew rate at the first time point. For example, when the preset period is 10 seconds, and the slew rate at the first time point is 100 V/ns and the acquired load is 40% of the maximum load, the load acquired at the second time point, which is 10 seconds after the first time point, may be 50% of the maximum load. When the predetermined magnitude is 10 V/ns, the controller 110 can decrease the slew rate to 90 V/ns.

On the contrary, when the load acquired at the second time point later than the first time point is lower than the load acquired at the first time point, the controller 110 can increase the slew rate at the second time point by a predetermined magnitude, compared to the slew rate at the first time point. For example, when the preset period is 10 seconds, and the slew rate at the first time point is 90 V/ns and the acquired load is 50% of the maximum load, the load acquired at the second time point, which is 10 seconds after the first time point, is 40% of the maximum load. When the predetermined magnitude is 10 V/ns, the controller 110 can increase the slew rate to 100 V/ns. A similar process in real-time can occur for a third time point after the second time point, etc. That is, the power supply device 100 can acquire the load change in real time, and accordingly, also change the slew rate in real time (e.g., first time point, second time point, third time point, fourth time point, etc.)

In other words, the power supply device 100 can change the slew rate in real time according to a change in the load of the electronic device 200. Accordingly, there is an advantage in that it is possible to finely adjust EMI reduction and power efficiency improvement effects according to a change in the load of the power supply device 100. In addition, by changing the slew rate every preset period, there is an advantage in that it is possible to prevent a failure due to a sudden change in the slew rate.

Further, according to another embodiment of the present disclosure, the power supply device 100 can acquire at least one of the at least one switching element Q, acquire the load of the electronic device 200 based on the acquired voltage and/or current, and adjust the slew rate of the at least one switching element Q based on the acquired load. When the SMPS 120 includes a first switching element Q1 and a second switching element Q2, the controller 110 can acquire the voltage and/or current of at least one of the first switching element Q1 and the second switching element Q2. As the load of the electronic device 200 increases, the voltage and current of the switching element Q is large. Therefore, the controller 110 can acquire that the load of the electronic device 200 increases as the voltage and/or current of the switching element Q increases. The controller 110 can also adjust the slew rate of the at least one switching element Q based on the acquired load.

In addition, the controller 110 can acquire the operating frequency of the power supply device 100 and acquire the load of the electronic device 200 based on the acquired operating frequency. As described above, as the load of the electronic device 200 increases, the operating frequency of the power supply device 100 decreases. Therefore, as the acquired operating frequency of the power supply device 100 decreases, the load of the electronic device 200 increases. The controller 110 can thus adjust the slew rate of the at least one switching element Q based on the acquired load.

As described above, the scope of the present disclosure is not limited to the above-described embodiment, and the controller 110 can acquire all values proportional to or inversely proportional to the load of the electronic device 200. In addition, the load is acquired based on the acquired value, and the slew rate is adjusted based on the acquired load.

Next, an effect of adjusting the slew rate of the power supply device 100 according to an embodiment of the present disclosure will be described. In particular, FIG. 14 includes graphs illustrating a measured EMI level of a power supply device, according to an embodiment of the present disclosure.

Figure 14:
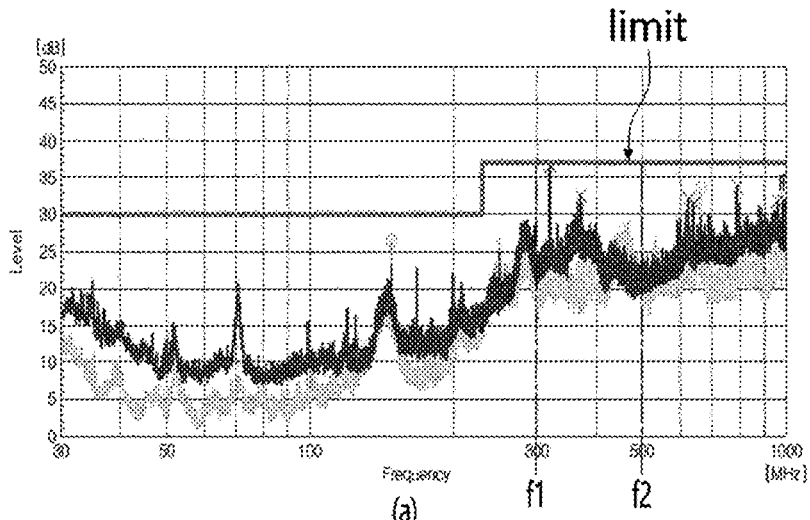
FIG. 14 includes graphs illustrating measured EMI levels of a power supply device, according to an embodiment of the present disclosure.
Figure 14:
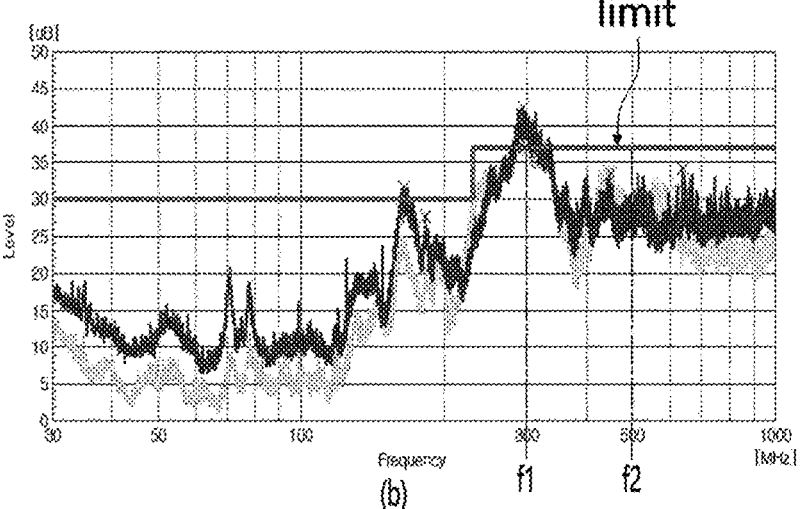
Figure 14:
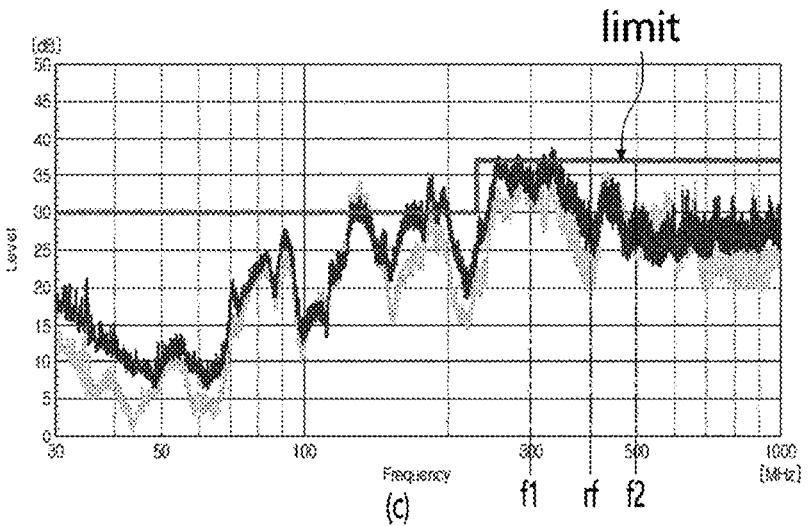

In FIG. 14, the x-axis represents the EMI frequency of the power supply device 100, and the y-axis represents the EMI level. In addition, the limit is a line indicating the limit of the allowable EMI level according to the EMI standard. FIGS. 14(*a*) and (*b*) are the same as FIGS. 3 and 4. That is, FIG. 14(*a*) is a graph illustrating the measured EMI level when the slew rate of the switching element of the power supply device 100 is fixed to 25 V/ns, and FIG. 11(*b*) is a graph illustrating a measured EMI level is measured when the slew rate of the switching element of the power supply device 100 is fixed to 100 V/ns.

In addition, FIG. 14(*c*) is a graph illustrating a measured EMI level when the slew rate of the switching element Q of the power supply device 100 is varied. Specifically, FIG. 14(*c*) illustrates adjusting the slew rate to 100 V/ns when the EMI above the reference EMI frequency (rf) is generated in the power supply device 100, and when adjusting the slew rate to 25 V/ns when the EMI below the reference EMI frequency (rf) is generated.

Further, the operating frequency of the power supply device 100 increases as the load of the electronic device 200 decreases. In addition, the EMI frequency generated by the power supply device 100 increases as the operating frequency increases. That is, when the load of the electronic device 200 is the second value, the power supply device 100 can operate at a first operating frequency, and when the load of the electronic device 200 is the first value less than the second value, the power supply device 100 can operate at a second operating frequency greater than the first operating frequency. The EMI having a first EMI frequency f1 is generated when the power supply device 100 operates at a first operating frequency, and the EMI having a second EMI frequency f2 greater than the first EMI frequency is generated when the power supply device 100 operates at a second operating frequency f2 greater than the first operating frequency f1.

Further, referring to FIG. 14(*a*), when the slew rate is 25 V/ns, the EMI level of the EMI having the first EMI frequency f1 does not exceed the limit. On the other hand, referring to FIG. 11(*b*), when the slew rate is 100 V/ns, the EMI level of the EMI having the first EMI frequency f1 exceeds the limit. Accordingly, referring to FIG. 11(*c*), when the power supply device 100 operates at the first operating frequency and the EMI having the first EMI frequency f1 is generated, the slew rate is adjusted to 25 V/ns to reduce the EMI level.

Next, referring to FIG. 14(*b*), when the slew rate is 100 V/ns, the EMI level of the EMI having the second EMI frequency f2 does not exceed the limit. When the EMI having the second EMI frequency f2 is generated, the operating frequency of the power supply device 100 has a second operating frequency greater than the first operating frequency. An improved power efficiency improvement effect according to adjusting the slew rate when the operating frequency of the power supply device 100 is the second operating frequency is greater than when the operating frequency of the power supply device 100 is the first operating frequency. Accordingly, referring to FIG. 14(*c*), when the power supply device 100 operates at the second operating frequency and the EMI having the second EMI frequency f2 is generated, the slew rate is adjusted to 100 V/ns to improve the power efficiency.

In summary, the power supply device 100 according to an embodiment of the present disclosure can reduce EMI generation or improve power efficiency based on the load. For example, when the load of the electronic device 200 is a reference load, EMI generated from the power supply device 100 can have a reference EMI frequency rf. For example, the reference EMI frequency rf can be 400 MHz. In addition, when the load of the electronic device 200 has the first value, the second EMI frequency f2 generated from the power supply device 100 can be 500 MHz. When the load of the electronic device 200 has the second value greater than the first value, the first EMI frequency f1 generated from the power supply device 100 can be 300 MHz. Accordingly, the power supply device 100 can adjust the slew rate to 25 V/ns so that the EMI level generated when the load has the second value does not exceed the limit. In addition, the power supply device 100 can adjust the slew rate to 100 V/ns to improve power efficiency by reducing switching loss when the load has the first value. That is, the power supply device 100 according to an embodiment of the present disclosure can reduce the EMI level or improve power efficiency by adjusting the slew rate based on the load of the electronic device 200.

As a load of an electronic device decreases, power to be supplied to the electronic device decreases and a switching frequency increases. Accordingly, as the load of the electronic device decreases, a slew rate of a switching element included in a power supply is increased to reduce a switching loss, thereby improving power efficiency. As the load of the electronic device increases, power to be supplied to the electronic device increases and the switching frequency decreases. Accordingly, as the load of the electronic device increases, the slew rate of the switching element is decreased to reduce ringing of a switching node, thereby reducing EMI.

According to an embodiment of the present disclosure, it is possible to adjust the slew rate of the switching element without modifying or adding a separate physical structure. Accordingly, there is an advantage in that a printed circuit board (PCB) can be efficiently designed to minimize problems such as cost or volume increase and to reduce EMI and improve power efficiency. According to an embodiment of the present disclosure, by changing the slew rate in real time according to a change in the load of the electronic device, there is an advantage in that EMI reduction and power efficiency improvement, as well as failure due to a sudden change in the slew rate, can be prevented.

What is claimed is:

1. A power supply device for supplying power to an electronic device, the power supply device comprising: a switched mode power supply (SMPS) configured to convert an input power input to the power supply device to the power supplied to the electronic device, the SMPS comprising at least one switching element and a gate driver connected to the at least one switching element; a load acquiring unit configured to acquire at least one of a voltage of the SMPS and a current of the SMPS; and a controller configured to: determine a load of the electronic device based on the acquired voltage and/or current of the SMPS; adjust a slew rate of the at least one switching element based on the load; and adjust an operating frequency of the at least one switching element based on the load, wherein electromagnetic interference (EMI) caused by the at least one switching element having a first EMI frequency is generated when the power supply device operates at a first operating frequency, and the EMI having a second EMI frequency greater than the first EMI frequency is generated when the power supply device operates at a second operating frequency greater than the first operating frequency, and wherein the controller is further configured to change the slew rate of the at least one switching element in response to the EMI exceeding a predetermined EMI level.

2. The power supply device of claim 1, wherein the controller is further configured to:
increase the slew rate in response to a decrease of the load.

3. The power supply device of claim 1, wherein the controller is further configured to:
decrease the slew rate in response to an increase of the load.

4. The power supply device of claim 1, wherein the controller is configured to:
adjust the slew rate of the at least one switching element to a first value in response to the load being equal to or greater than a preset reference ratio of a maximum load of the electronic device by adjusting a resistance value of the gate driver controlling the at least one switching element, and
adjust the slew rate of the at least one switching element to a second value greater than the first value in response the load being less than the preset reference ratio of the maximum load by adjusting the resistance value of the gate driver controlling the at least one switching element.

5. The power supply device of claim 1, wherein the controller is further configured to:
increase the slew rate of the at least one switching element by decreasing a resistance value of the gate driver as the load decreases, and decrease the slew rate of the at least one switching element by increasing the resistance value of the gate driver as the load increases.

6. The power supply device of claim 1, wherein the SMPS further comprises:
a bridge circuit to which the input power is applied;
an LLC resonant circuit connected to the bridge circuit; and
a power factor improving unit configured to improve a power factor of the input power and output the input power with the improved power factor to the bridge circuit,
wherein the load acquiring unit is configured to acquire at least one of an output voltage of the power factor improving unit and an output current of the power factor improving unit, and
wherein the controller is further configured to determine the load of the electronic device based on the acquired output voltage and/or output current of the power factor improving unit, and adjust the slew rate based on a resistance value of the gate driver based on the load of the electronic device.

7. The power supply device of claim 6, wherein the controller is further configured to:
decrease the slew rate as the voltage and/or the current of the power output from the power factor improving unit increases, and
increase the slew rate as the voltage and/or the output current of the power output from the power factor improving unit decreases.

8. The power supply device of claim 1, wherein the controller is further configured to:
determine the load of the electronic device every preset period, and
in response to a load acquired at a second time point later than a first time point being higher than a load acquired at the first time point, decrease the slew rate at the second time point by a predetermined magnitude, compared to the slew rate at the first time point.

9. The power supply device of claim 1, wherein the SMPS includes a half-bridge converter including a first switching element and a second switching element.

10. The power supply device of claim 9, wherein the controller is further configured to:
increase slew rates of the first switching element and the second switching element in response to a decreased load of the electronic device, and
decrease the slew rates of the first switching element and the second switching element in response to an increased load of the electronic device.

11. The power supply device of claim 1, wherein the controller is further configured to:
determine the load at a first time point,
determine the load at a second time point after the first time point,
in response to the determined load at the second time point being larger than the load at the first time point, decrease the slew rate of the at least one switching element by a predetermined magnitude, and
in response to the determined load at the second time point being smaller than the determined load at the first time point, increase the slew rate of the at least one switching element by the predetermined magnitude.

12. The power supply device of claim 11, wherein the controller is further configured to:
determine the load at a third time point after the second time point, in response to the determined load at the third time point being larger than the load at the second time point, decrease the slew rate of the at least one switching element by the predetermined magnitude, and in response to the determined load at the third time point being smaller than the determined load at the second time point, increase the slew rate of the at least one switching element by the predetermined magnitude.

13. The power supply device of claim 1, wherein in response to the load of the electronic device being a second value, the at least one switching element of the power supply device operates at the first operating frequency, and in response to the load of the electronic device being a first value less than the second value, the at least one switching element of the power supply device operates at the second operating frequency greater than the first operating frequency.

14. The power supply device of claim 13, wherein the EMI caused by the at least one switching element having the first EMI frequency is generated when the power supply device operates at the first operating frequency, and the EMI having the second EMI frequency greater than the first EMI frequency is generated when the power supply device operates at the second operating frequency greater than the first operating frequency.

15. The power supply device of claim 14, wherein the controller is further configured to decrease the slew rate of the at least one switching element in response to the EMI having the first EMI frequency exceeding the predetermined EMI level, and the controller is further configured to increase the slew rate of the at least one switching element in response to the EMI having the second EMI frequency exceeding the predetermined EMI level.

16. A method of controlling a power supply device for supplying power to an electronic device, the method comprising: acquiring at least one of a voltage of the power supply device and a current of the power supply device; determining, via a controller of the power supply device, a load of the electronic device based on the acquired voltage of the power supply device and/or current of the power supply device; adjusting, via the controller, a slew rate of at least one switching element to a first value when the load is equal to or greater than a preset reference ratio of a maximum load of the electronic device by adjusting a resistance value of a gate driver controlling the at least one switching element; adjusting, via the controller, the slew rate of the at least one switching element to a second value greater than the first value when the load is less than the preset reference ratio of the maximum load by adjusting the resistance value of the gate driver controlling the at least one switching element; and adjusting, via the controller, an operating frequency of the at least one switching element based on the load, wherein electromagnetic interference (EMI) caused by the at least one switching element having a first EMI frequency is generated when the power supply device operates at a first operating frequency, and the EMI having a second EMI frequency greater than the first EMI frequency is generated when the power supply device operates at a second operating frequency greater than the first operating frequency, and changing the slew rate of the at least one switching element, via the controller, in response to the EMI exceeding the predetermined EMI level.

17. The method of claim 16, further comprising:

increasing the slew rate of the at least one switching element by decreasing the resistance value of the gate driver in a response to a decrease of the load; and decreasing the slew rate of the at least one switching element by increasing the resistance value of the gate driver in response to an increase of the load.

18. The method of claim 16, wherein acquiring at least one of the voltage of the power supply device and the current of the power supply device includes at least one of acquiring a voltage an input power input to the power supply device and/or a current of the input power input to the power supply device; and acquiring a voltage of the at least one switching element and/or a current of the at least one switching element.

19. The method of claim 16, wherein operating the at least one switching element of the power supply device at the first operating frequency in response to the load of the electronic device being a second value; and operating the at least one switching element of the power supply device at the second operating frequency greater than the first operating frequency in response to the of the electronic device being a first value less than the second value.

20. The method of claim 16, further comprising: decreasing, via the controller, the slew rate of the at least one switching element in response to the EMI having the first EMI frequency exceeding the predetermined EMI level; and increasing, via the controller, the slew rate of the at least one switching element in response to the EMI having the second EMI frequency exceeding the predetermined EMI level, wherein EMI caused by the at least one switching element having the first EMI frequency is generated when the power supply device operates at the first operating frequency, and the EMI having the second EMI frequency greater than the first EMI frequency is generated when the power supply device operates at the second operating frequency greater than the first operating frequency.

21. The method of claim 16, further comprising a load acquiring unit configured to acquire at least one of a voltage of an input power and a current of the input power; and/or at least one of a voltage of the at least one switching element and a current of the at least one switching element, wherein the controller is configured to determine the load of the electronic device based on the acquired voltage and/or current of the input power, and/or determine the load of the electronic device based on the acquired voltage and/or current of the at least one switching element.

\* \* \* \* \*